United States Patent
Sathyanarayanamurthy

(10) Patent No.: US 11,095,685 B2
(45) Date of Patent: Aug. 17, 2021

(54) NODE ACCESS CONTROL

(71) Applicant: Nokia Technologies Oy, Espoo (FI)

(72) Inventor: Kiran Channakeshavapura Sathyanarayanamurthy, Tumkur (IN)

(73) Assignee: Nokia Technologies Oy, Espoo (FI)

( * ) Notice: Subject to any disclaimer, the term of this patent is extended or adjusted under 35 U.S.C. 154(b) by 86 days.

(21) Appl. No.: 16/418,687

(22) Filed: May 21, 2019

(65) Prior Publication Data
US 2019/0379701 A1 Dec. 12, 2019

(30) Foreign Application Priority Data
May 23, 2018 (IN) .............................. 201811019212

(51) Int. Cl.
*H04L 29/06* (2006.01)
*H04W 12/06* (2021.01)

(52) U.S. Cl.
CPC .......... *H04L 63/20* (2013.01); *H04L 63/0428* (2013.01); *H04L 63/08* (2013.01); *H04L 63/108* (2013.01); *H04W 12/06* (2013.01); *H04L 63/166* (2013.01)

(58) Field of Classification Search
CPC ..... H04L 63/20; H04L 63/0428; H04L 63/08; H04L 63/108; H04W 12/06
See application file for complete search history.

(56) References Cited

U.S. PATENT DOCUMENTS

| 7,444,368 | B1* | 10/2008 | Wong | ..................... | G06F 21/31 709/200 |
|---|---|---|---|---|---|
| 2003/0231102 | A1 | 12/2003 | Fisher | | |
| 2006/0156385 | A1* | 7/2006 | Chiviendacz | ......... | H04L 9/3271 726/2 |
| 2008/0034207 | A1* | 2/2008 | Cam-Winget | ........ | H04L 63/205 713/163 |
| 2008/0155658 | A1* | 6/2008 | Leinonen | .......... | H04W 12/0609 726/4 |

(Continued)

FOREIGN PATENT DOCUMENTS

| CN | 105225314 A | 1/2016 |
| CN | 106184122 A | 12/2016 |

OTHER PUBLICATIONS

"Meet the Singapore-designed Smart Lock That Doesn't Need Wi-Fi to Work", Singapore Hardwarezone, Retrieved on May 16, 2019, Webpage available at : http://www.hardwarezone.com.sg/feature-meet-singapore-designed-smart-lock-doesn-t-need-wi-fi-work.

(Continued)

*Primary Examiner* — Tongoc Tran
(74) *Attorney, Agent, or Firm* — Harrington & Smith

(57) ABSTRACT

According to an example aspect of the present invention, there is provided an apparatus comprising a memory configured to store access control parameters, and at least one processing core, configured to replace a first access control mechanism in a remote node with a second access control mechanism which is defined by the access control parameters, the access control parameters comprising references to a mathematical operations database, the references comprising mathematical operation identifiers, and at least one connector defining a sequence of mathematical operations.

18 Claims, 6 Drawing Sheets

(56) References Cited

U.S. PATENT DOCUMENTS

| | | | |
|---|---|---|---|
| 2009/0133117 A1* | 5/2009 | Bentley | H04L 9/3271 726/17 |
| 2009/0165103 A1* | 6/2009 | Cho | G06F 21/6218 726/6 |
| 2009/0327131 A1* | 12/2009 | Beenau | G06Q 20/40 705/44 |
| 2010/0058450 A1 | 3/2010 | Fein et al. | |
| 2010/0082136 A1* | 4/2010 | Rosenblatt | B01D 53/944 700/94 |
| 2010/0299716 A1* | 11/2010 | Rouskov | H04L 63/105 726/1 |
| 2011/0090097 A1 | 4/2011 | Beshke | |
| 2011/0191592 A1 | 8/2011 | Goertzen | |
| 2013/0043973 A1 | 2/2013 | Greisen et al. | |
| 2017/0161973 A1* | 6/2017 | Katta | G07C 5/085 |

OTHER PUBLICATIONS

Rekha et al., "Enhanced Key Life in Online Authentication Systems Using Virtual Password", 2011 Eighth International Conference on Information Technology: New Generations, Apr. 11-13, 2011, pp. 366-369.

Gurung et al., "Enhanced Virtual Password Authentication Scheme Resistant to Shoulder Surfing", 2015 Second International Conference on Soft Computing and Machine Intelligence (ISCMI), Nov. 23-24, 2015, pp. 134-139.

Umadevi et al., "Stronger Authentication for Password Using Virtual Password and Secret Little Functions", International Conference on Information Communication and Embedded Systems (ICICES2014), Feb. 27-28, 2014, 6 pages.

Xiao et al., "Secret Little Functions and Codebook for Protecting Users from Password Theft", 2008 IEEE International Conference on Communications, May 19-23, 2008, pp. 1-6.

\* cited by examiner $X = 11\ 12\ 34\ 11\ 12\ 34$
$\phantom{X=}\times\ \times\ \times$
$\phantom{X=}56\ 77\ 90\ 56\ 77\ 90$ $= (1080 - 3388)\ (1904 - 990)\ (847 - 672)$ $\underline{-2308i + 914j + 175k}$ 11-12-34--56-77-90
-2304
914
175

NODE ACCESS CONTROL

FIELD

The present disclosure relates to controlling access to a node, such as, for example, and Internet of Things node.

BACKGROUND

In a networked environment, nodes may be accessed by interacting with access control mechanisms. An analogy for an access control mechanism is a conventional lock, wherein a person needs a corresponding key to open the lock.

Access control mechanisms may comprise, for example, passwords, biometric access control mechanisms or time-based access control mechanisms. A biometric access control mechanisms may comprise using a fingerprint or other information derived from a biological source, such as the user's body. Time-based access control may comprise limiting access to a node based on temporal limitations. Examples of temporal limitations include allowing access at only specified times of day, or only during specified days.

SUMMARY OF THE INVENTION

According to some aspects, there is provided the subject-matter of the independent claims. Some embodiments are defined in the dependent claims.

According to a first aspect of the present invention, there is provided an apparatus comprising a memory configured to store access control parameters, and at least one processing core, configured to replace a first access control mechanism in a remote node with a second access control mechanism which is defined by the access control parameters, the access control parameters comprising references to a mathematical operations database, the references comprising mathematical operation identifiers, and at least one connector defining a sequence of mathematical operations.

According to a second aspect of the present invention, there is provided an apparatus comprising at least one processing core, at least one memory including computer program code, the at least one memory and the computer program code being configured to, with the at least one processing core, cause the apparatus at least to receive, from a user equipment, access control parameters defining an access control mechanism, the access control parameters comprising references to a mathematical operations database, the references comprising mathematical operation identifiers, and at least one connector defining a sequence of mathematical operations, obtain a random sequence and a response to the random sequence using the access control parameters, and transmit the random sequence to a second user equipment as a challenge, and verify a reply from the second user equipment matches the response.

According to a third aspect of the present invention, there is provided a method in an apparatus, comprising storing access control parameters, and replacing a first access control mechanism in a remote node with a second access control mechanism which is defined by the access control parameters, the access control parameters comprising references to a mathematical operations database, the references comprising mathematical operation identifiers, and at least one connector defining a sequence of mathematical operations.

According to a fourth aspect of the present invention, there is provided a method in an apparatus, comprising receiving, from a user equipment, access control parameters defining an access control mechanism, the access control parameters comprising references to a mathematical operations database, the references comprising mathematical operation identifiers, and at least one connector defining a sequence of mathematical operations, obtaining a random sequence and a response to the random sequence using the access control parameters, and transmitting the random sequence to a second user equipment as a challenge, and verifying a reply from the second user equipment matches the response.

According to a fifth aspect of the present invention, there is provided an apparatus comprising means for storing access control parameters, and means for replacing a first access control mechanism in a remote node with a second access control mechanism which is defined by the access control parameters, the access control parameters comprising references to a mathematical operations database, the references comprising mathematical operation identifiers, and at least one connector defining a sequence of mathematical operations.

According to a sixth aspect of the present invention, there is provided an apparatus comprising means for receiving, from a user equipment, access control parameters defining an access control mechanism, the access control parameters comprising references to a mathematical operations database, the references comprising mathematical operation identifiers, and at least one connector defining a sequence of mathematical operations, means for obtaining a random sequence and a response to the random sequence using the access control parameters, and for transmitting the random sequence to a second user equipment as a challenge, and means for verifying a reply from the second user equipment matches the response.

According to a seventh aspect of the present invention, there is provided a non-transitory computer readable medium having stored thereon a set of computer readable instructions that, when executed by at least one processor, cause an apparatus to at least store access control parameters, and replace a first access control mechanism in a remote node with a second access control mechanism which is defined by the access control parameters, the access control parameters comprising references to a mathematical operations database, the references comprising mathematical operation identifiers, and at least one connector defining a sequence of mathematical operations.

According to an eighth aspect of the present invention, there is provided a non-transitory computer readable medium having stored thereon a set of computer readable instructions that, when executed by at least one processor, cause an apparatus to at least receive, from a user equipment, access control parameters defining an access control mechanism, the access control parameters comprising references to a mathematical operations database, the references comprising mathematical operation identifiers, and at least one connector defining a sequence of mathematical operations, obtain a random sequence and a response to the random sequence using the access control parameters, and transmitting the random sequence to a second user equipment as a challenge, and verify a reply from the second user equipment matches the response.

According to a ninth aspect of the present invention, there is provided a computer program configured to cause, when run on a processor, a method in accordance with at least one of the third or fourth aspects to be performed.

EMBODIMENTS

The present disclosure relates to a user-definable access control mechanism, wherein a user may re-configure an access control mechanism relating to a resource, such as a node, he can control. Examples of such a controllable node include a door and an Internet of Things, IoT, node. By re-configuring the access control mechanism the user may increase a safety level of the access control, since an insecure mechanism may be replaced by a new one. Further, if the mechanism is replaced with a new one often, for example every hour or every minute, it becomes very difficult for an attacker to keep pace with attacking the access control. Processing of mathematical functions comprised in the access control mechanism may be, at least partly, offloaded to a separate server, or to separate servers, since IoT nodes, for example, may have only limited processing capabilities. Use of separate server(s) is not present in all embodiments.

Figure 1:
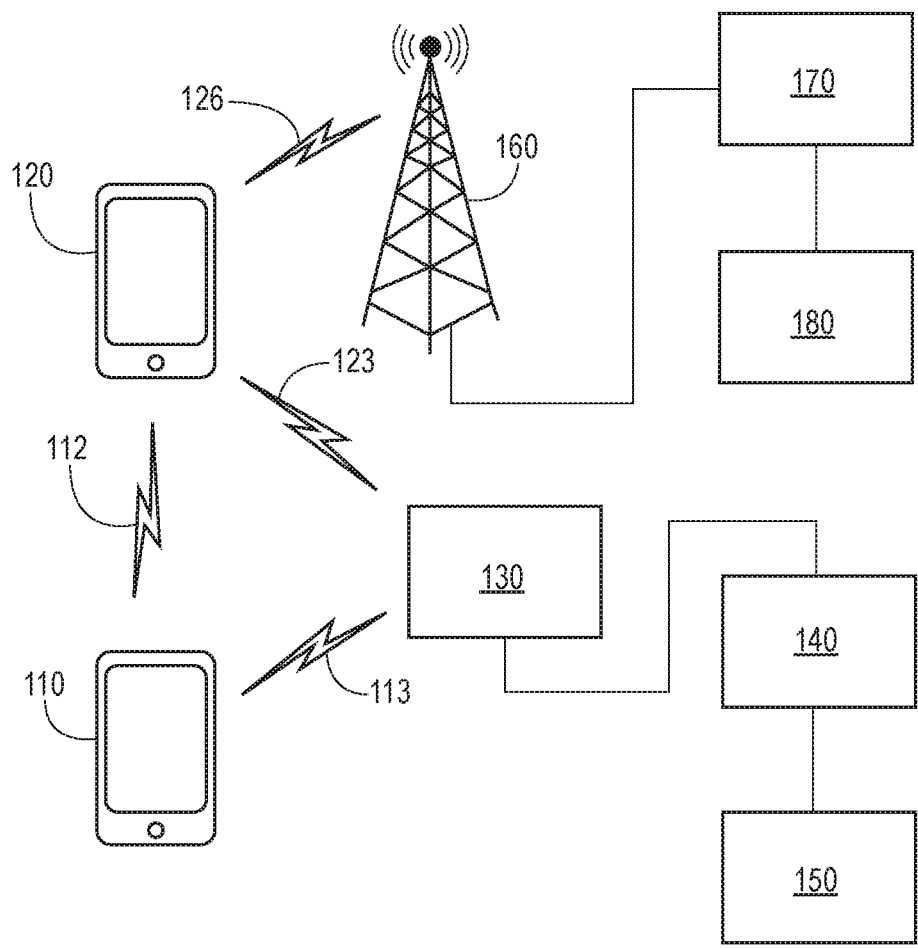
FIG. 1 illustrates an example system in accordance with at least some embodiments.

FIG. 1 illustrates an example system in accordance with at least some embodiments. Illustrated are user equipments 110 and 120. A user equipment, UE, may comprise a smartphone, cellular telephone, personal digital assistant, tablet computer, laptop computer, desktop computer or, indeed, another kind of suitable device associated with a user.

Remote node 130 may comprise an IoT node, an electronic lock, or an access control device controlling access to a room, for example. In general, remote node 130 is a node which is configured to control access to an access-controlled entity, such as medical records, a network drive, source code, a building or a vehicle, for example. UE 110 is configured to communicate with remote node 130 via wireless link 113. Wireless link 113 may act in accordance with a suitable short-range wireless communication technology, such as Bluetooth, Wibree or another technology. Likewise UE 120 is arranged to communicate with remote node 130 via wireless link 123. In certain embodiments, these links, although illustrated in FIG. 1 as wireless, are nonetheless wire-line connections.

Remote node 130 may be operably connected with a communication network, wherein gateway 140 and server 150 may be comprised. Gateway 140 may provide connectivity with a broader network. Server 150 may be a cloud processing server, for example, which may comprise a mathematical operations database. In some embodiments, gateway 140 is absent and server 150 is present.

The access-controlled entity is not illustrated in FIG. 1 for the sake of clarity. The UEs 110 and 120 are, in the illustrated example, capable of communicating via a communications system, wherein base station 160 is comprised. Base station 160 may be referred to as an access point depending on the technology used, however, in the present disclosure the term base station will be used throughout for the sake of clarity. In general, in cellular communications technologies the term base station is employed, whereas the term access point is often employed when non-cellular technologies are discussed. In some embodiments, the communications system is not wireless but a wire-line communications system.

Base station 160 may be operably connected with gateway 170 and server 180. Server 180 may comprise a mathematical operations database. The database of server 180 may be the same, or of a similar type, as the database in server 150. Indeed, in some embodiments servers 180 and 150 are one and the same server, although in other embodiments the servers are distinct from each other. Overall, the mathematical operations databases of servers 150 and 180 are interoperable in that they will return the same result, when prompted with the same query. In some embodiments, gateway 170 is absent and server 180 is present.

Remote node 130, and/or UEs 110 and 120 may be constrained as to the computation capabilities they are furnished with, wherefore relying on an external mathematical operations database may be useful in terms of allocating potentially heavy processing load to a more capable computational substrate. Similarly, memory resources may be constrained, wherefore also for that reason using an external server is useful, as memory resources of the remote node 130 and/or UEs 110 and 120 are not stretched, and complex processing operations may nonetheless be used.

UE 110 may be a user equipment of an owner of remote node 130, or a user equipment of a person entrusted to manage remote node 130, for example. As such, the user of UE 110 may configure an access control mechanism remote node 130 will apply, when deciding whether to grant access to the access-controlled entity to a node that requests such access. UE 110 may cause the access control mechanism in remote node 130 to be updated, or replaced with a new access control mechanism.

Causing the access control mechanism to be replaced may comprise providing, from UE 110, new access control parameters to remote node 130. The new access control parameters may be provided using an encrypted connection established over wireless link 113, for example. To enable this UE 110 and remote node 130 may have, for example, a statically configured, specific secret encryption key for a symmetric encryption algorithm, this specific key being used in updating the access control parameters. Examples of symmetric encryption algorithms include AES and Blowfish. Alternatively, a TLS connection may be used, for example, to prevent eavesdropping of the new access control parameters.

To generate new access control parameters, UE 110 may design an overall new access control mechanism. UE 110 may select mathematical operations to be included in the new access control mechanism. The mathematical operations may be selected from a list of mathematical operations available in a mathematical operations database. The access control parameters comprise references to the selected mathematical operations. Once the operations are selected, the UE 110 may select at least one connector which is used with the operations to define a sequence of operations for the new access control mechanism. The connectors, in other words, define an order in which the mathematical operations are performed to obtain a mathematical operation sequence which is the access control mechanism. The mathematical operations and/or connectors may be, at least partly, randomly selected. For example, a number sequence may be randomly generated in UE 110, and elements of this randomly generated number sequence may be used as the references to the mathematical operations and/or connectors. Mathematical operations may comprise operations using fixed or floating point variables.

As way of example, the mathematical operations may comprise sine, rounding and cosine. The connectors may comprise definitions that an output of the sine is rounded to reduce accuracy of the output, the rounded output is fed as input to the cosine function and the result of the cosine is rounded, to obtain the final result. In this example, the new access control parameters comprise references to the mathematical operations sine, cosine and rounding, and connectors describing how results from one operation are fed to the next operation in the sequence, to thereby define the overall sequence which forms the access control mechanism.

As way of a second example, the access control mechanism comprises building a 3*2 matrix, obtaining a nearest prime number of the sum of the first column, and concatenating the first digits of each element in the matrix with the nearest prime: a random sequence {11, 12, 34, 56, 77, 90} is provided as a challenge. A matrix

[11, 12
34, 56
77, 90]

is generated. The sum 11+34+77=122, and the nearest prime number to this is 123. Thus the response to the challenge will be 113579123.

The access control parameters may comprise an indication as to how long the access control mechanism defined by the parameters is to remain valid. This is a time validity period. For example, the mechanism may be valid for one week, one day, one hour or one minute. In some embodiments, the access control parameters define more than one access control mechanism, such that once the first access control mechanism expires, in accordance with its time validity period, the next access control mechanism may be taken into use. As the access control parameters may be provided to further user equipments to thereby grant access, these further user equipments can use the time validity periods in the access control parameters to select the correct access control mechanism to use at the time they seek access to remote node 130.

UE 110 may, having configured the new access control mechanism in remote node 130, grant UE 120 access to the remote node by informing UE 120 of the access control parameters, for example via wireless link 112, or elsehow. Communications over wireless link 112 may be secured using normal methods, such as TLS, PGP or SSH, for example.

Once UE 120, being in possession of the access control parameters, seeks access to remote node 130, remote node 130 may issue a challenge to UE 120 over wireless link 123. UE 120 may use the challenge and the access control parameters to determine a response to the challenge.

Alternatively to a challenge, the access control parameters may comprise a static input sequence to the mathematical operation sequence defined as the access control mechanism. In these cases, seeking access to remote node 130 may comprise providing to node 130 a similarly static response obtained using the static input sequence as input to the mathematical operation sequence defined as the access control mechanism.

In this regard, UE 120 may have server 180 perform mathematical processing of at least part of the challenge, under the direction of UE 120. UE 120 may, in this regard, provide information from the challenge and the access control parameters to server 180 via wireless link 126, base station 160 and gateway 170, and receive in response information for the response to the challenge. For example, UE 120 may specify to server 180 which mathematical operations it wants performed, and UE 120 may provide elements based on the challenge as inputs to these mathematical operations. Server 180 may then provide as responses to UE 120 the results of the requested mathematical operations.

Where UE 120 itself performs the operations defined by the connectors in the access control parameters, server 180 is not enabled to determine what the access control parameters, in whole, are. Server 180 will only know which mathematical operations are requested of it, but not in which order and/or how the results thereof are processed. In some embodiments, UE 120 is configured to request at least one decoy mathematical operation from server 180, which is not based on the access control parameters, to make it even more difficult for server 180 to determine what the access control parameters are. Further, where possible, UE 120 may send requests to server 180 in a different order than the order in which the mathematical operations are indicated in the access control parameters.

In general, obtaining the response by UE 120 may comprise processing of the mathematical operations identified by the identifiers comprised in the access control parameters outsourced from UE 120 to a computation node distinct from UE 120, and applying the at least one connector locally in UE 120. UE 110 may obtain the response in a similar way, when accessing the remote node.

For its part, remote node 130 may also determine the response to the challenge it sent to UE 120. Remote node 130 may determine the response itself, or with recourse to server 150, along similar lines as described above for UE 120 having recourse to server 180. Thus the server(s) 150 and/or 180 may perform, at least partly, mathematical processing needed to obtain the response to the challenge, without becoming aware of the contents of the access control parameters. Once remote node 130 receives from UE 120 the response UE 120 has obtained to the challenge, remote node 130 may compare this to the response it has obtained independently of UE 120, and where the responses are the same, that is, they match, remote node 130 may give UE 120 access.

In general, more than one server may be used. A mathematical operations database may be distributed over more than one server, such that a UE or remote node may request processing accordingly, from a server that is enabled to perform the specific processing in question. The mathematical operations database may be re-shuffled between participating servers, such that abilities to perform specific mathematical operations are moved from one server to another. This may assist in obfuscating the operation of the access control mechanisms.

A variance factor may be used, for example comprised in the access control parameters, which defines an extent of change required when changing to a new access control mechanism. For example, where the variance factor is low, a low number of mathematical operations are changed when changing to a new access control mechanism. Correspondingly, when the variance factor is high, a high number of mathematical operations are changed when changing to a new access control mechanism. As a specific example, the variance factor may directly indicate the number of mathematical operations changed or added when when changing to a new access control mechanism. That is, a variance of 1 indicates that one mathematical operation should be changed or added in a subsequent access control mechanism, and a variance of 5 may indicate that five mathematical operations should be changed or added in a subsequent access control mechanism. This the variance factor may be used to increase the complexity of locks by setting the variance factor, and where a random process is employed in complying with the variance factor, random mathematical operation selection is achieved, enhancing security of the access control mechanisms.

The following table presents an example set of mathematical operations that may be comprised in the mathematical operations database:

| Operation identifier | Mathematical operation |
|---|---|
| 1 | Addition |
| 2 | Inverse value f(x) = 1/x |
| 3 | Subtraction |
| 4 | Multiplication |
| 5 | Division |
| 6 | Mean value |
| 7 | Radius of, f(x) = x/(2 * pi) |
| 8 | Add x to and subtract Y from mean |
| 9 | Closest prime number for mean of first column |
| 10 | Sum of first row for latin square of order X |
| 11 | Fourier transform |
| 12 | Z-transform |
| 13 | Simple interest |
| 14 | Compound interest |
| 15 | Average distance between point X1 and X2 when keys are on shape X |

Further examples of mathematical operations are in the following tables:

| TOPIC | ID | FUNCTION | LOCATION-ID | OUTPUT-LOC |
|---|---|---|---|---|
| FT | 309 | dft | <URL> | <URL> |
| FT | 310 | inverseDft | <URL> | <URL> |
| ZT | 409 | zt | <URL> | <URL> |
| ZT | 410 | inverseZt | <URL> | <URL> |
| ZT | 411 | advancedZt | <URL> | <URL> |
| Vectors | 509 | components | <URL> | <URL> |
| Vectors | 510 | eigen | <URL> | <URL> |
| Vectors | 511 | hermitian | <URL> | <URL> |
| Vectors | 512 | sparse | <URL> | <URL> |

| TOPIC | ID | FUNCTION | LOCATION-ID | OUTPUT-LOC |
|---|---|---|---|---|
| Matrix | 708 | makeMatrix | <URL> | <URL> |
| Matrix | 709 | addRow | <URL> | <URL> |
| Matrix | 710 | addColumn | <URL> | <URL> |
| Matrix | 711 | transpose | <URL> | <URL> |
| Graph | 909 | randomWalk | <URL> | <URL> |
| Graph | 909 | curvilinear | <URL> | <URL> |
| Graph | 1000 | convexHull | <URL> | <URL> |
| Graph | 1002 | parabola | <URL> | <URL> |
| Graph | 1003 | hyperBola | <URL> | <URL> |
| Graph | 1009 | ellipse | <URL> | <URL> |
| ASTRO | 1909 | k-index | <URL> | <URL> |
| ASTRO | 2909 | Binmat | <URL> | <URL> |

Examples of connectors are provided in the following table:

| CONNECTOR | ID | FUNCTION |
|---|---|---|
| LOGICAL | 1 | expression |
| AIRTHMETIC | 2 | operators |
| STRING | 90 | concatenate |
| MATERIALISTIC | 3 | t-joint |
| MATERIALISTIC | 4 | s-joint |
| MATERIALISTIC | 5 | weld |
| MATERIALISTIC | 6 | spiral |
| MATERIALISTIC | 7 | beam |
| MATERIALISTIC | 8 | rigidBend |
| CONCEPTUAL | 10 | event |
| CONCEPTUAL | 20 | stream |
| CONCEPTUAL | 21 | link |
| CONCEPTUAL | 22 | adapter |

Figures 2A, 2B:
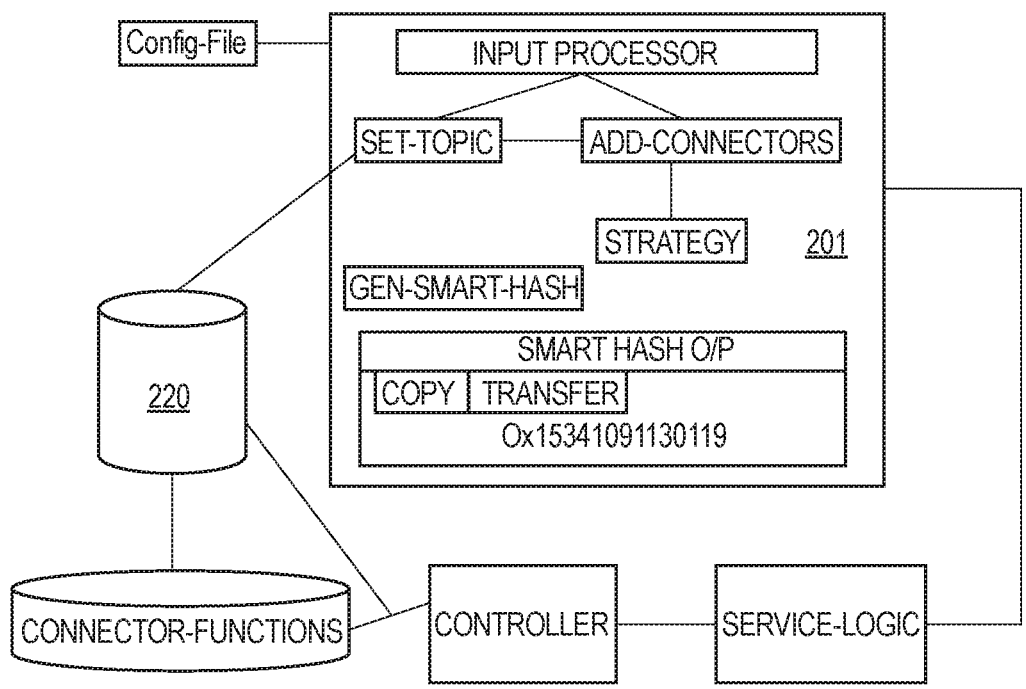
FIG. 2A illustrates an example access control mechanism.
FIG. 2B illustrates an example system in accordance with at least some embodiments.

FIG. 2A illustrates another example access control mechanism. The challenge in this example is the same as in the example described above, namely, {11, 12, 34, 56, 77, 90}. Here, first a vector cross product is obtained from the challenge, as illustrated on the left. The integers—2308, 914 and 175 are obtained. Next, illustrated on the right, a concatenation operation is made as illustrated by the arrows, to derive the hash 111234-2304914175 175914-2304567790. This amounts to a "t-joint" concatenation mode. In the latter phase, the elements of the challenge vector are concatenated with results of the cross product. In detail, this concatenation comprises providing the results of the cross product in between elements of the input vector, concatenated twice, in opposite orders.

FIG. 2B illustrates an example system in accordance with at least some embodiments. Device 201 corresponds essentially to, for example, UE 110 of FIG. 1. This device comprises the processing capability to formulate access control parameters. In detail, mathematical operations are selected by SET-TOPIC functionality, connectors added by ADD-CONNECTORS functionality, under the direction of the processor and a strategy element, which may be configured by the user, for example. The INPUT-PROCESSOR may comprise a general purpose processor, as described herein below in connection with FIG. 3, and functions SET-TOPIC, ADD-CONNECTORS and STRATEGY may be implemented in software. GEN-SMART-HASH and SMART-HASH O/P may be employed in accessing the remote node to obtain a response to a challenge received from the remote node. In general, the response to the challenge may be referred to as a smart hash.

The mathematical operations database 220 is comprised in a server, which device 201 may access, as outlined above in connection with FIG. 1. Connectors may be obtained from databases, as illustrated, or device 201 may be in possession of connectors by virtue of being configured to generate new access control parameters.

An example configuration file, comprising a access control parameters, is given in the following:

```
{ "inputRandSeq": ["1","2","3","4","90","7891","YY","KA"],
  "mathKBSelectors":["409","509","909"],
  "connectors":["1","3","22"],
  "timeDetails":{
    "timePeriodic":["execPeriodic","5"],
    "timeRandomize":["periodic","rand"],
    "ttl":100
  },
  "variance":{
```

```
  "factor":10,
  "topics-progression": ["incremental"],
},
"appearence": {
  "timePeriod":["1","3","4","5","6","90"]
}
"strategy": {
       "dimension":"3D",
}}
```

Figure 3:
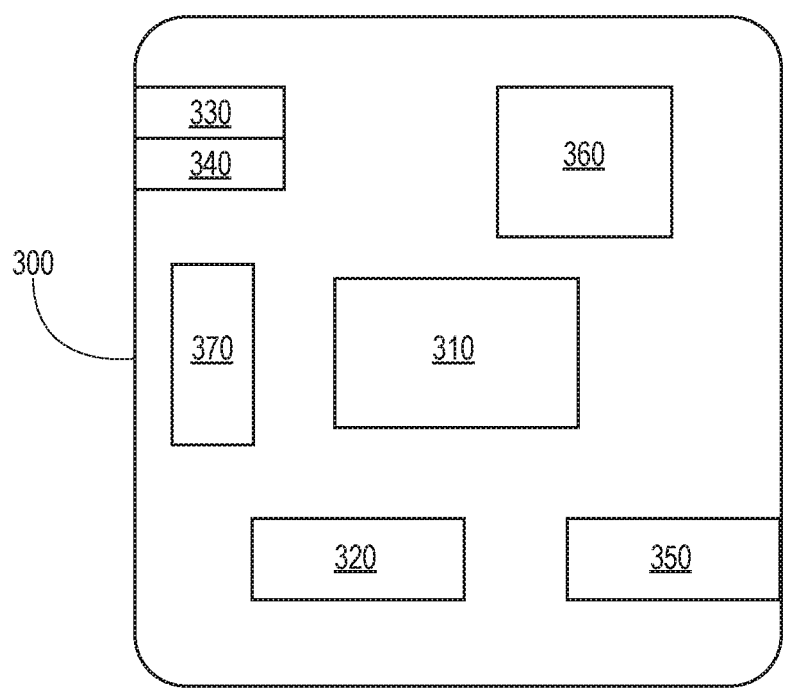
FIG. 3 illustrates an example apparatus capable of supporting at least some embodiments.

FIG. 3 illustrates an example apparatus capable of supporting at least some embodiments. Illustrated is device 300, which may comprise, for example, a user equipment such as UE 110 of FIG. 1 device 201 of FIG. 2. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to configure access control mechanisms.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
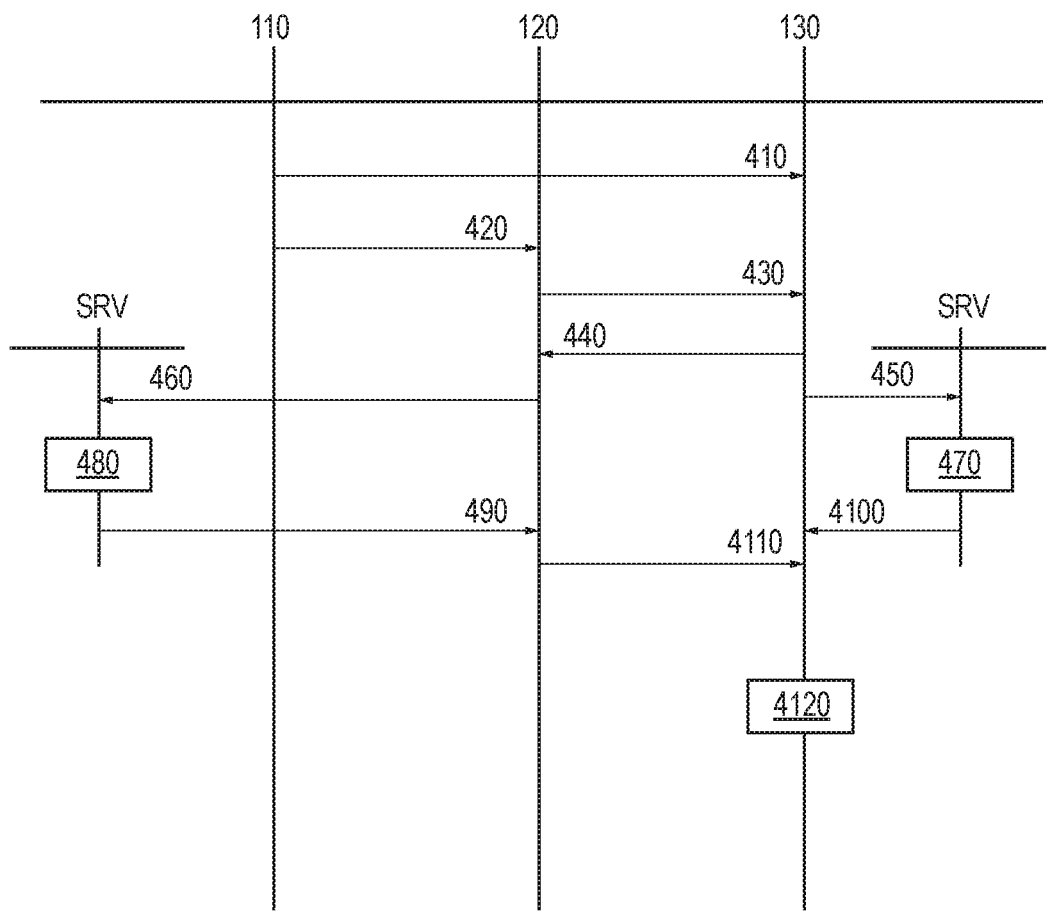
FIG. 4 illustrates signaling in accordance with at least some embodiments.

FIG. 4 illustrates signaling in accordance with at least some embodiments. On the vertical axes are disposed, on the left, UE 110 of FIG. 1, in the centre, UE 120 of FIG. 1 and on the right, remote node 130 of FIG. 1. Time advances from the top toward the bottom.

In phase 410, UE 110 configures a new access control mechanism in remote node 130, replacing a previous access control mechanism of remote node 130. Phase 410 may comprise providing new access control parameters to remote node 130, as described herein above. In phase 420, UE 110 informs UE 120 of the new access control mechanism, for example by providing to UE 120 the access control parameters of the new access control mechanism.

In phase 430, UE 420 requests access from remote node 130. In response, in phase 440, remote node 130 issues a challenge to UE 120, the challenge comprising, for example, a challenge vector. Based on the challenge and the access control mechanism, remote node 130 requests processing from a server SRV, to thereby, at least in part, obtain a correct response to the challenge. Likewise, UE 120 requests processing from a server SRV in phase 460. The servers may be one and the same server, or they may be distinct, as described herein above.

In phases 470 and 480, the server or servers perform mathematical operations as requested by remote node 130 and UE 120, in accordance with the access control mechanism. Results are provided in phases 490 and 4100, as illustrated. Obtaining the response may require requesting the server to perform a mathematical operation, or operations, more than once, for example where a following mathematical operation is dependent on a result of a preceding mathematical operation in the sequence of mathematical operations which define the access control mechanism. Obtaining the result to the challenge from the responses from the server may comprise applying the connectors to, for example, perform a concatenation of results obtained from a server in a specific way.

Once UE 120 has the result, it provides it to remote node 130 in phase 4110. Responsively, in phase 4120, remote node 130 compares the response it has received from UE 120, in phase 4110, to the result it has obtained itself. In case the responses are the same, that is, they match, remote node 130 may provide the requested access to UE 120. In case they do not match, remote node 120 may provide an error message to UE 120, for example.

Figure 5:
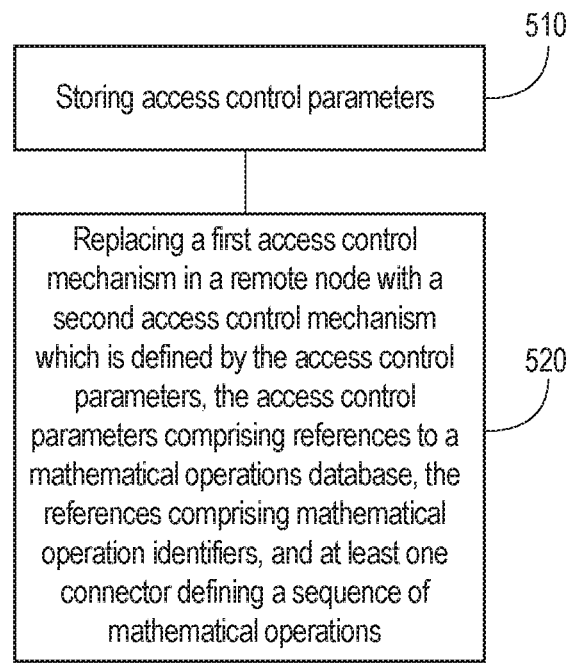
FIG. 5 is a flow graph of a method in accordance with at least some embodiments.

FIG. 5 is a flow graph of a method in accordance with at least some embodiments. The phases of the illustrated method may be performed in UE 110, for example, or in a control device configured to control the functioning of UE 110, when installed therein.

Phase 510 comprises storing access control parameters. Phase 520 comprises replacing a first access control mechanism in a remote node with a second access control mechanism which is defined by the access control parameters, the access control parameters comprising references to a mathematical operations database, the references comprising mathematical operation identifiers, and at least one connector defining a sequence of mathematical operations. That is, the access control parameters comprise the references and at least one connector. The at least one connector need not be comprised in the references. In some embodiments, the mathematical operations database is not comprised in an apparatus performing the method.

Figure 6:
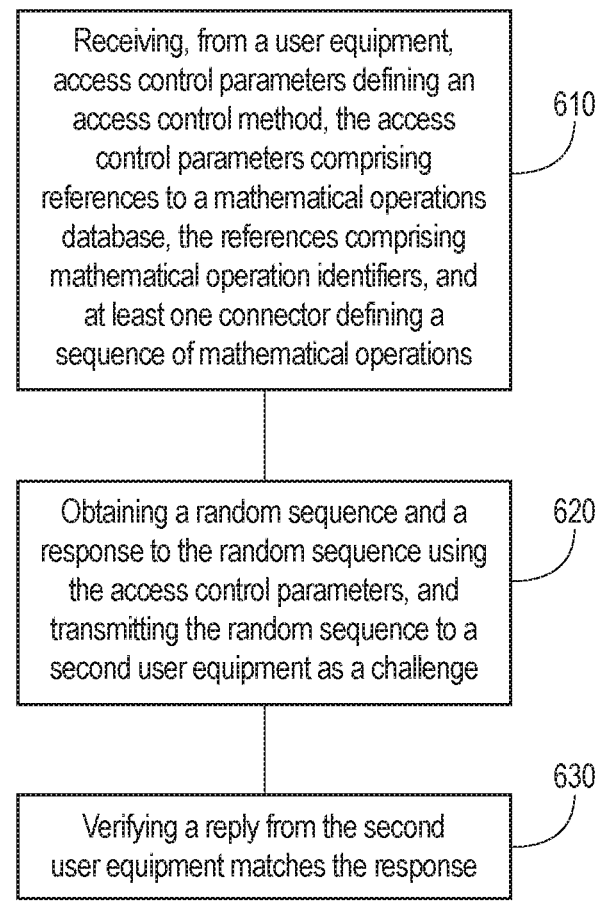
FIG. 6 is a flow graph of a method in accordance with at least some embodiments.

FIG. 6 is a flow graph of a method in accordance with at least some embodiments. The phases of the illustrated method may be performed in remote node 130, for example, or in a control device configured to control the functioning of remote node 130, when installed therein.

Phase 610 comprises receiving, from a user equipment, access control parameters defining an access control mechanism, the access control parameters comprising references to a mathematical operations database, the references comprising mathematical operation identifiers, and at least one connector defining a sequence of mathematical operations. Phase 620 comprises obtaining a random sequence and a response to the random sequence using the access control parameters, and transmitting the random sequence to a second user equipment as a challenge. Finally, phase 630 comprises verifying a reply from the second user equipment matches the response It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in enhancing network and/or node security.

ACRONYMS LIST

| | |
|---|---|
| AES | advanced encryption standard |
| PGP | pretty good privacy, e.g. openPGP (RFC 4880) |
| SSH | secure shell, as defined by IETF |
| TLS | transport layer security, as defined by IETF |
| UE | user equipment |

REFERENCE SIGNS LIST

| | |
|---|---|
| 110, 120 | user equipment (UE) |
| 130 | Remote node |
| 140, 170 | Gateway |
| 150, 180, | Server |
| 160 | Base station |
| 112, 113, 123, 126 | Wireless interfaces |
| 201 | Device (FIG. 2) |
| 220 | mathematical operations database |
| 300-370 | Structure of the device of FIG. 3 |
| 410-4120 | Phases of the method of FIG. 4 |
| 510-520 | Phases of the method of FIG. 5 |
| 610-630 | Phases of the method of FIG. 6 |

The invention claimed is:

1. An apparatus comprising
at least one processing core,
at least one memory including computer program code, the at least one memory and the computer program code being configured to, with the at least one processing core, cause the apparatus at least to:
store access control parameters, wherein the access control parameters comprise a time validity period for selecting a subsequent access control mechanism from the access control parameters;
based on expiry of the time validity period, replace a first access control mechanism in a remote node with a second access control mechanism which is defined by the access control parameters, the access control parameters comprising references to a mathematical operations database, the references comprising mathematical operation identifiers, and at least one connector defining a sequence of mathematical operations, wherein the access control parameters comprise a variance factor, and wherein the variance factor is set to identify a number of mathematical operations that are changed based on the expiry of the time validity period for the defined sequence of mathematical operations of the second access control mechanism.

2. The apparatus according to claim 1, wherein the mathematical operations database is in a server distinct from both the apparatus and the remote node.

3. The apparatus according to claim 1, wherein the at least one processing core is further configured to cause the apparatus to inform the remote node of the access control parameters, to thereby replace the first access control mechanism with the second access control mechanism.

4. The apparatus according to claim 1, wherein the at least one processing core is configured to cause the apparatus to transmit the access control parameters to the remote node over an encrypted connection between the apparatus and the remote node.

5. The apparatus according to claim 1, wherein the at least one processing core is further configured to receive a challenge from the remote node, to obtain a response to the challenge using the access control parameters and to cause the response to be transmitted to the remote node.

6. The apparatus according to claim 5, wherein the at least one processing core is configured to obtain the response using processing outsourced from the apparatus to a computation node distinct from the apparatus, and to apply the at least one connector locally in the apparatus.

7. The apparatus according to claim 1, wherein the at least one processing core is configured to obtain, from a peer node of the apparatus, second access control parameters relating to a second remote node.

8. The apparatus according to claim 1, wherein the at least one processing core is configured to provide, to a peer node of the apparatus, the access control parameters.

9. An apparatus comprising
at least one processing core, at least one memory including computer program code, the at least one memory and the computer program code being configured to, with the at least one processing core, cause the apparatus at least to:
receive, from a user equipment, access control parameters defining an access control mechanism, the access control parameters comprising a time validity period for selecting a subsequent access control mechanism from the access control parameters, and references to a mathematical operations database, the references comprising mathematical operation identifiers, and at least one connector defining a sequence of mathematical operations;
obtain, based on expiry of the time validity period, a random sequence and a response to the random sequence using the access control parameters, wherein the access control parameters comprise a variance factor, and wherein the variance factor is set to identify a number of mathematical operations that are changed based on the expiry of the time validity period for the defined sequence of mathematical operations of the second access control mechanism; and transmit the random sequence to a second user equipment as a challenge, and verify a reply from the second user equipment matches the response.

10. The apparatus according to claim 9, wherein the mathematical operations database is in a server distinct from both the apparatus and the first and second user equipments.

11. A method in an apparatus, comprising:
storing access control parameters, wherein the access control parameters comprise a time validity period for selecting a subsequent access control mechanism from the access control parameters; and
based on expiry of the time validity period, replacing a first access control mechanism in a remote node with a second access control mechanism which is defined by the access control parameters, the access control parameters comprising references to a mathematical operations database, the references comprising mathematical operation identifiers, and at least one connector defining a sequence of mathematical operations, wherein the access control parameters comprise a variance factor, and wherein the variance factor is set to identify a number of mathematical operations that are changed based on the expiry of the time validity period for the defined sequence of mathematical operations of the second access control mechanism.

12. The method according to claim 11, wherein the mathematical operations database is in a server distinct from both the apparatus and the remote node.

13. The method according to claim 11, further comprising informing the remote node of the access control parameters, to thereby replace the first access control mechanism with the second access control mechanism.

14. The method according to claim 11, further comprising transmitting the access control parameters to the remote node over an encrypted connection between the apparatus and the remote node.

15. The method according to claim 11, further comprising receiving a challenge from the remote node, obtaining a response to the challenge using the access control parameters and causing the response to be transmitted to the remote node.

16. The method according to claim 15, further comprising obtaining the response using processing outsourced from the apparatus to a computation node distinct from the apparatus and applying the at least one connector locally in the apparatus.

17. A method in an apparatus, comprising:
receiving, from a user equipment, access control parameters defining an access control mechanism, the access control parameters comprising a time validity period for selecting a subsequent access control mechanism from the access control parameters, and references to a mathematical operations database, the references comprising mathematical operation identifiers, and at least one connector defining a sequence of mathematical operations;
obtaining, based on expiry of the time validity period, a random sequence and a response to the random sequence using the access control parameters, wherein the access control parameters comprise a variance factor, and wherein the variance factor is set to identify a number of mathematical operations that are changed based on the expiry of the time validity period for the defined sequence of mathematical operations of the second access control mechanism; and
transmitting the random sequence to a second user equipment as a challenge, and verifying a reply from the second user equipment matches the response.

18. A non-transitory computer readable medium having stored thereon a set of computer readable instructions that, when executed by at least one processor, cause an apparatus to at least:
store access control parameters, wherein the access control parameters comprise a time validity period for selecting a subsequent access control mechanism from the access control parameters; and
based on expiry of the time validity period, replace a first access control mechanism in a remote node with a second access control mechanism which is defined by the access control parameters, the access control parameters comprising references to a mathematical operations database, the references comprising mathematical operation identifiers, and at least one connector defining a sequence of mathematical operations, wherein the access control parameters comprise a variance factor, and wherein the variance factor is set to identify a number of mathematical operations that are changed based on the expiry of the time validity period for the defined sequence of mathematical operations of the second access control mechanism.

* * * * *